(12) United States Patent
Weiner

(10) Patent No.: US 11,028,776 B2
(45) Date of Patent: *Jun. 8, 2021

(54) DUAL FUNCTION AIR DIVERTER AND VARIABLE AREA FAN NOZZLE

(71) Applicant: RAYTHEON TECHNOLOGIES CORPORATION, Farmington, CT (US)

(72) Inventor: Richard Alan Weiner, Farmington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 148 days.

This patent is subject to a terminal disclaimer.

(21) Appl. No.: 16/207,838

(22) Filed: Dec. 3, 2018

(65) Prior Publication Data

US 2019/0101055 A1 Apr. 4, 2019

Related U.S. Application Data

(63) Continuation of application No. 14/513,409, filed on Oct. 14, 2014, now Pat. No. 10,145,304.

(Continued)

(51) Int. Cl.
*F02C 7/14* (2006.01)
*F02C 7/042* (2006.01)
(Continued)

(52) U.S. Cl.
CPC ........... *F02C 7/14* (2013.01); *F01D 25/12* (2013.01); *F01D 25/18* (2013.01); *F02C 7/042* (2013.01);
(Continued)

(58) Field of Classification Search
CPC ..... F02C 7/185; F02C 7/14; F02C 9/18; F01D 25/12; F01D 25/18
See application file for complete search history.

(56) References Cited

U.S. PATENT DOCUMENTS 2,752,111 A 6/1956 Schairer
4,782,658 A * 11/1988 Perry .................. F02C 7/047
60/226.1
(Continued)

FOREIGN PATENT DOCUMENTS

EP 1916399 A2 4/2008
EP 2472067 A1 7/2012
(Continued)

OTHER PUBLICATIONS

EP Search Report for European Application No. 1515070351607; dated Jun. 10, 2015; 9 pgs.
European Search Report for Application No. EP 19 20 5889.

*Primary Examiner* — Justin D Seabe
(74) *Attorney, Agent, or Firm* — Cantor Colburn LLP

(57) ABSTRACT

A modulating fan air diverter and annular air-oil cooler for a gas turbine engine located in the inner fixed structure adjacent to the core cowl is provided. The fan air diverter modulates between an open position, corresponding to maximum fan nozzle area and airflow through the air-oil cooler, and a closed position, corresponding to minimum fan nozzle area and airflow through the air-oil cooler. As such, the device is capable of supporting dual functions of engine heat management as well as engine performance and fan stability.

20 Claims, 9 Drawing Sheets

Related U.S. Application Data

(60) Provisional application No. 61/926,661, filed on Jan. 13, 2014.

(51) Int. Cl.
    *F01D 25/12*     (2006.01)
    *F02K 3/06*     (2006.01)
    *F01D 25/18*     (2006.01)

(52) U.S. Cl.
    CPC ............ *F02K 3/06* (2013.01); *F05D 2220/32* (2013.01); *F05D 2250/411* (2013.01); *F05D 2260/213* (2013.01); *F05D 2270/66* (2013.01)

(56) References Cited

U.S. PATENT DOCUMENTS

| | | | |
|---|---|---|---|
| 8,387,362 | B2 | 3/2013 | Storage et al. |
| 9,587,561 | B2 * | 3/2017 | Snyder ...................... F02K 3/06 |
| 2010/0170220 | A1 * | 7/2010 | Kohlenberg .............. F02K 1/42 60/226.3 |
| 2011/0067413 | A1 | 3/2011 | Alecu et al. |
| 2012/0102915 | A1 * | 5/2012 | Baltas ....................... F02K 3/06 60/226.3 |
| 2012/0168115 | A1 * | 7/2012 | Raimarckers ........... F01D 25/02 165/41 |
| 2013/0247587 | A1 * | 9/2013 | Lo ........................ F01D 17/105 60/806 |
| 2014/0205446 | A1 * | 7/2014 | Patsouris .................. F02C 7/14 415/175 |
| 2015/0198092 | A1 | 7/2015 | Weiner |

FOREIGN PATENT DOCUMENTS

| | | |
|---|---|---|
| GB | 2204361 A | 11/1988 |
| WO | 2014123857 A1 | 8/2014 |
| WO | 204151685 A1 | 9/2014 |

\* cited by examiner

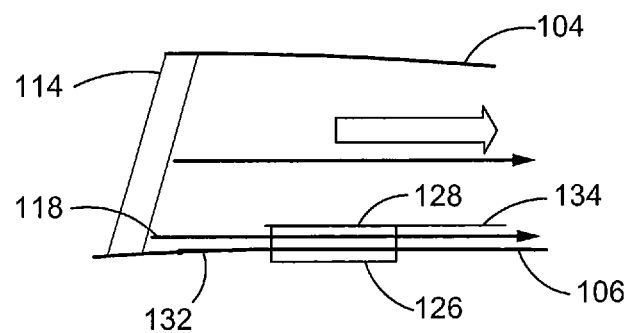
FIG. 6A
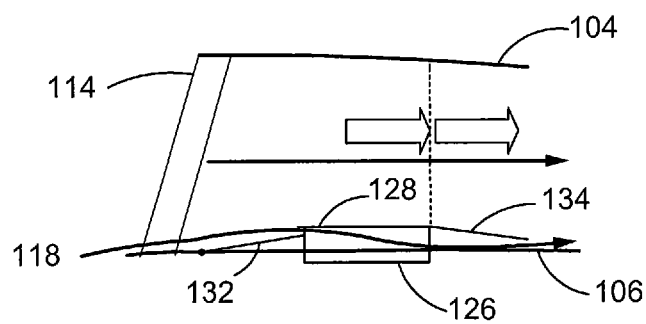
FIG. 6B
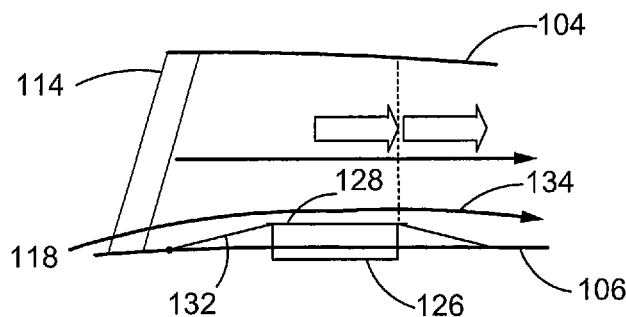
FIG. 6C
FIG. 6

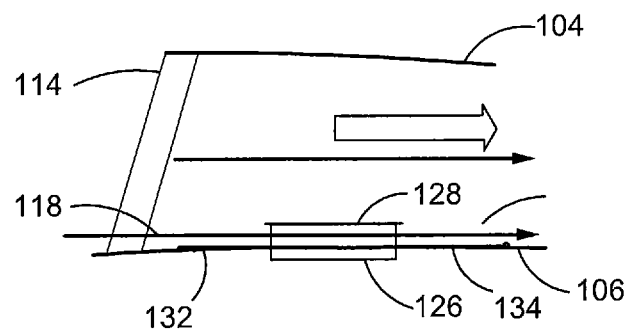
FIG. 7A
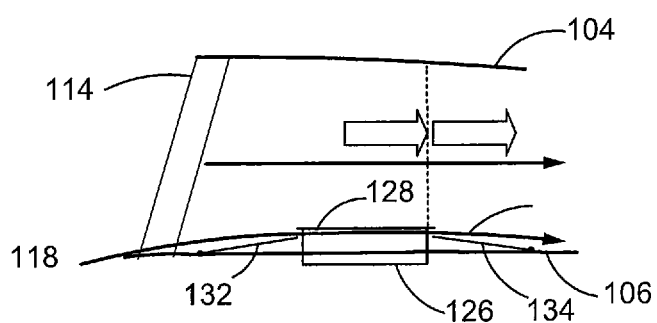
FIG. 7B
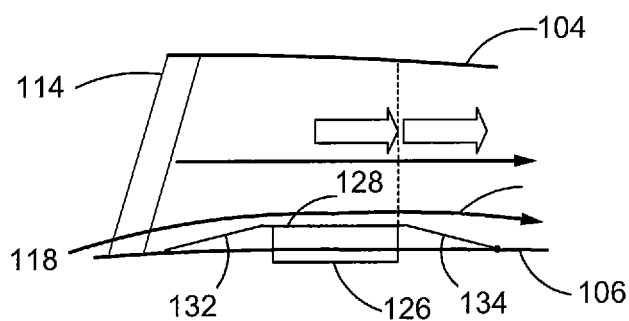
FIG. 7C
FIG. 7

DUAL FUNCTION AIR DIVERTER AND VARIABLE AREA FAN NOZZLE

CROSS-REFERENCE TO RELATED APPLICATION

This application is a continuation of U.S. patent application Ser. No. 14/513,409 filed on Oct. 14, 2014, which claims priority to U.S. Provisional Application Ser. No. 61/926,661 filed on Jan. 13, 2014, the contents each of which are incorporated herein by reference thereto.

FIELD OF THE DISCLOSURE

The present disclosure generally relates to gas turbine engines, and more particularly, to a dual function fan air diverter and variable area fan nozzle for use with gas turbine engines.

BACKGROUND OF THE DISCLOSURE

A gas turbine engine is typically provided with an oil tank as well as means for cooling the oil circulated therethrough. In some configurations, a gas turbine engine may employ an annular-type air-oil cooler that is circumferentially positioned about the low pressure compressor in the inner fixed structure section of the inner cowl and provided with cooling fins disposed in general fluid communication with a fan duct and nozzle of the gas turbine engine. More specifically, the inner surface of the outer nacelle and the outer surface of the inner cowl at the low pressure compressor section define a fan duct and nozzle through which fan airflow is received. The air-oil cooler cooling fins extend into the fan duct so as to dissipate excess heat from the oil being circulated through the annular air-oil cooler into the fan airflow passing thereby.

In some gas turbine engine configurations, an annular fan air diverter assembly is provided to modulate the amount of fan airflow which passes through a plurality of cooling fins of the annular air-oil cooler, and thereby modulate the oil temperature. The annular air-oil cooler in conjunction with the modulating fan air diverter is part of the engine heat management system. These configurations may also employ separate assemblies for modulating the fan nozzle area to improve performance and fan stability during operation of the gas turbine engine. Having assemblies that are separately installed and individually controlled come with increased costs, added complexity and other drawbacks. The present disclosure is directed at addressing one or more of these deficiencies.

SUMMARY OF THE DISCLOSURE

In accordance with one aspect of the disclosure, a fan air diverter for a gas turbine engine having at least an inner cowl and an annular air-oil cooler is provided. The fan air diverter may include a nozzle flap disposed circumferentially about the inner cowl and coaxially adjacent to the annular air-oil cooler, and an actuator assembly operatively coupling the nozzle flap to the inner cowl. The nozzle flap may be pivotally coupled to the inner cowl and selectively movable relative to the annular air-oil cooler between an open position and a closed position. The actuator assembly may be configured to actuate the nozzle flap between the open position and the closed position.

In accordance with another aspect of the disclosure, an oil cooling assembly for a gas turbine engine having at least an inner cowl is provided. The oil cooling assembly may include an annular air-oil cooler circumferentially disposed about the inner cowl, and a fan air diverter circumferentially disposed about the inner cowl and coaxially adjacent to the cooling fins. The annular air-oil cooler may include an integral annular oil tank and a plurality of cooling fins radially extending therefrom. The cooling fins may be disposed in at least partial communication with a fan duct and nozzle of the gas turbine engine for receiving fan airflow. The fan air diverter may be selectively movable relative to the cooling fins so as to modulate fan airflow.

In accordance with yet another aspect of the disclosure, a gas turbine engine is provided. The gas turbine engine may include an outer nacelle and an inner cowl defining a fan duct and nozzle for receiving fan airflow, an annular air-oil cooler disposed circumferentially about the inner cowl and in communication with the fan duct and nozzle, at least one nozzle flap disposed circumferentially about the inner cowl and coaxially adjacent to the annular air-oil cooler, and an actuator assembly operatively coupling the nozzle flap to the inner cowl. The nozzle flap may be pivotally coupled to the inner cowl and selectively movable relative to the annular air-oil cooler between an open position and a closed position. The actuator assembly may be configured to actuate the nozzle flap between the open position and the closed position so as to modulate fan airflow through the air-oil cooler for heat management and to vary either the fan nozzle throat or exit area for engine performance and fan stability purposes.

These and other aspects of this disclosure will become more readily apparent upon reading the following detailed description when taken in conjunction with the accompanying drawings.

BRIEF DESCRIPTION OF THE DRAWINGS

FIGS. 6A-6C are cross-sectional views of another fan air diverter with fore and aft nozzle flaps in fully open, intermediate and fully closed positions;

FIGS. 7A-7C are cross-sectional views of yet another fan air diverter with fore and aft nozzle flaps in fully open, intermediate and fully closed positions;

Figure 1:
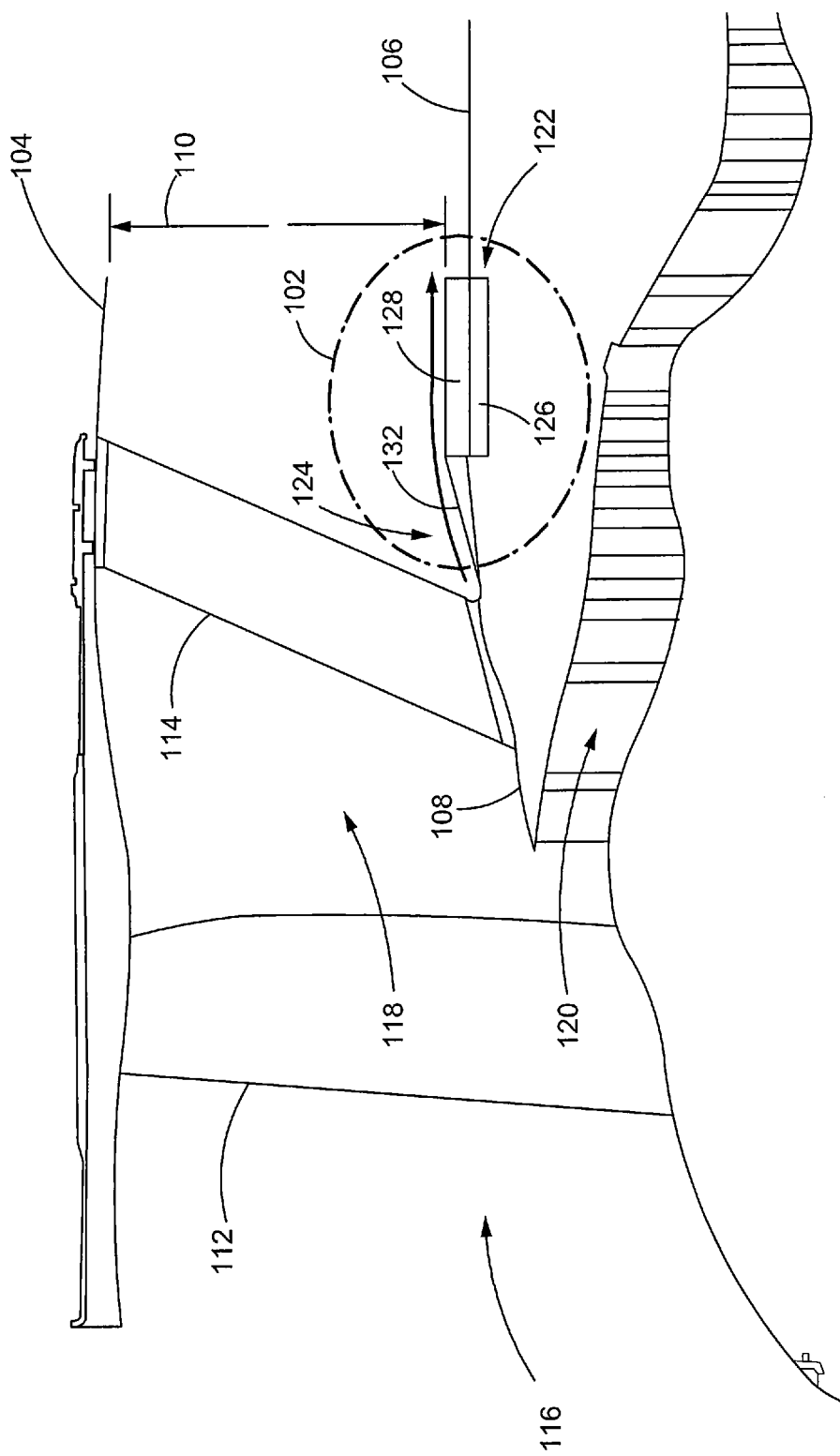
FIG. 1 is a partial, cross-sectional view of the front section of a gas turbine engine having a fan air diverter in the closed position.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring to FIG. 1, the front section of a gas turbine engine 100 having an exemplary oil cooling assembly 102 constructed in accordance with the present disclosure is provided. Among other things, the front section of the gas turbine engine 100 may generally include an outer nacelle 104, an inner cowl 106, a splitter 108, fan blades 112, exit guide vanes 114 and a fan duct and nozzle 110 associated therewith. Moreover, as indicated by the arrows shown, airflow 116 entering into the gas turbine engine 100 may be split by the splitter 108 into bypass or fan airflow 118 flowing through the fan duct and nozzle 110 and primary or core airflow 120 flowing into the low pressure compressor.

Figure 2A:
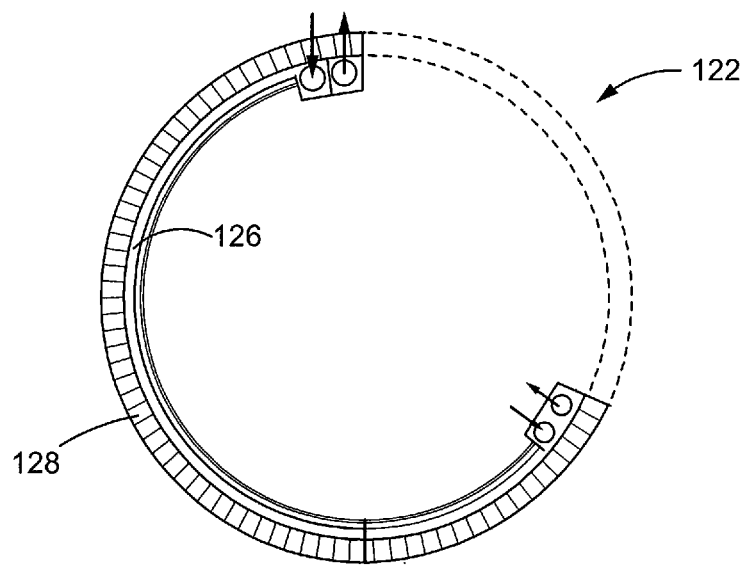
FIG. 2A is an axial, cross-sectional view of a section of an annular air-oil cooler.
Figure 2B:
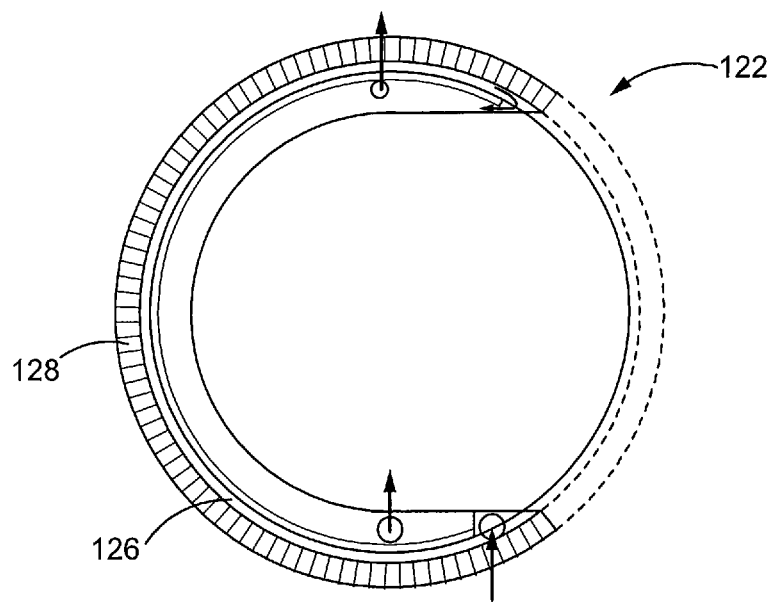
FIG. 2B is an axial, cross-sectional view of a section of a dual function air-oil cooler with integral oil tank.

The oil cooling assembly 102 of the gas turbine engine 100 of FIG. 1 may be circumferentially disposed about an outer surface of the inner fixed structure in front of the inner cowl 106, and generally composed of at least one annular air-oil cooler 122 and an annular fan air diverter 124 coaxially adjacent thereto. With further reference to the partial, axial cross-section provided in FIG. 2A, the annular air-oil cooler 122 may include an arcuate finned oil channel 126 through which oil is circulated for cooling. The annular air-oil cooler 122 may further include a plurality of cooling fins 128 radially extending thereabout which conduct heat from the oil within the finned oil channel 126 and dissipate the heat into the bypass or fan airflow 118 passing thereby. In other embodiments, such as shown in the partial, axial cross-section provided in FIG. 2B, an integral oil tank may be provided along the inner surface of the annular air-oil cooler 122.

Figure 3:
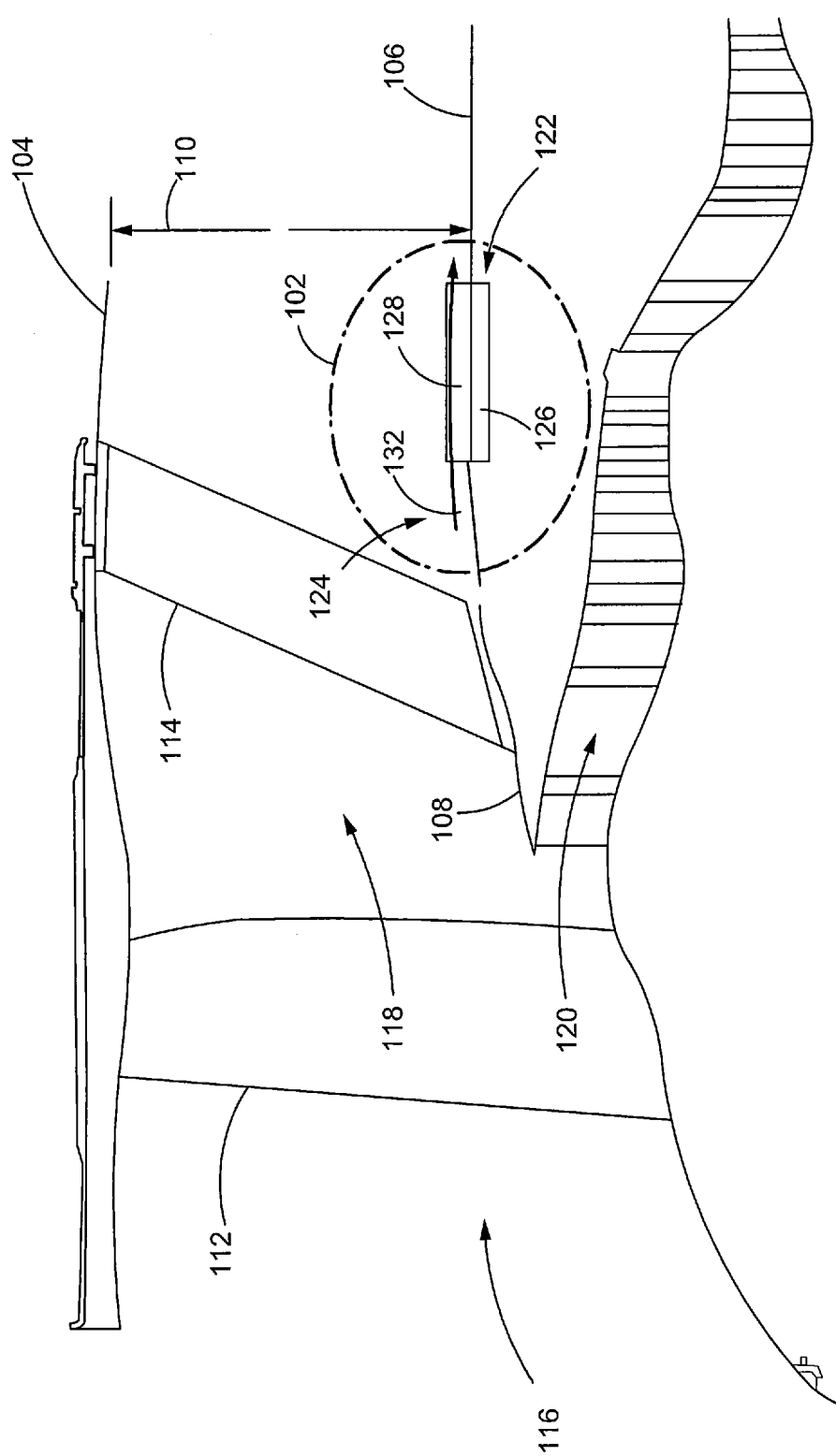
FIG. 3 is a partial, cross-sectional view of a low pressure compressor section of a gas turbine engine having a fan air diverter in the opened position.

As further shown in FIG. 1, the cooling fins 128 of the annular air-oil cooler 122 may extend into the fan duct and nozzle 110 and into the path of the fan airflow 118. Correspondingly, the fan air diverter 124 may provide at least one nozzle flap 132 adjacent to the inlet-side of the cooling fins 128 of the annular air-oil cooler 122 in a manner which enables not only modulation of oil cooling, but also variability of the fan nozzle exit or throat area. Specifically, the nozzle flap 132 may be pivotally or otherwise movably disposed relative to the cooling fins 128, and configured to selectively direct fan airflow 118 toward or away from the cooling fins 128. Moreover, the nozzle flap 132 may be actuated into a fully closed position, as shown in FIG. 1 for example, to divert fan airflow 118 away from the cooling fins 128, minimize cooling and reduce the fan nozzle area. The nozzle flap 132 may also be actuated into a fully open position, as shown in FIG. 3 for example, to completely expose the cooling fins 128 to the fan airflow 118, maximize cooling and increase the fan nozzle area. The nozzle flap 132 may also be actuated into any intermediate position between the fully closed and fully open positions.

Figure 4:
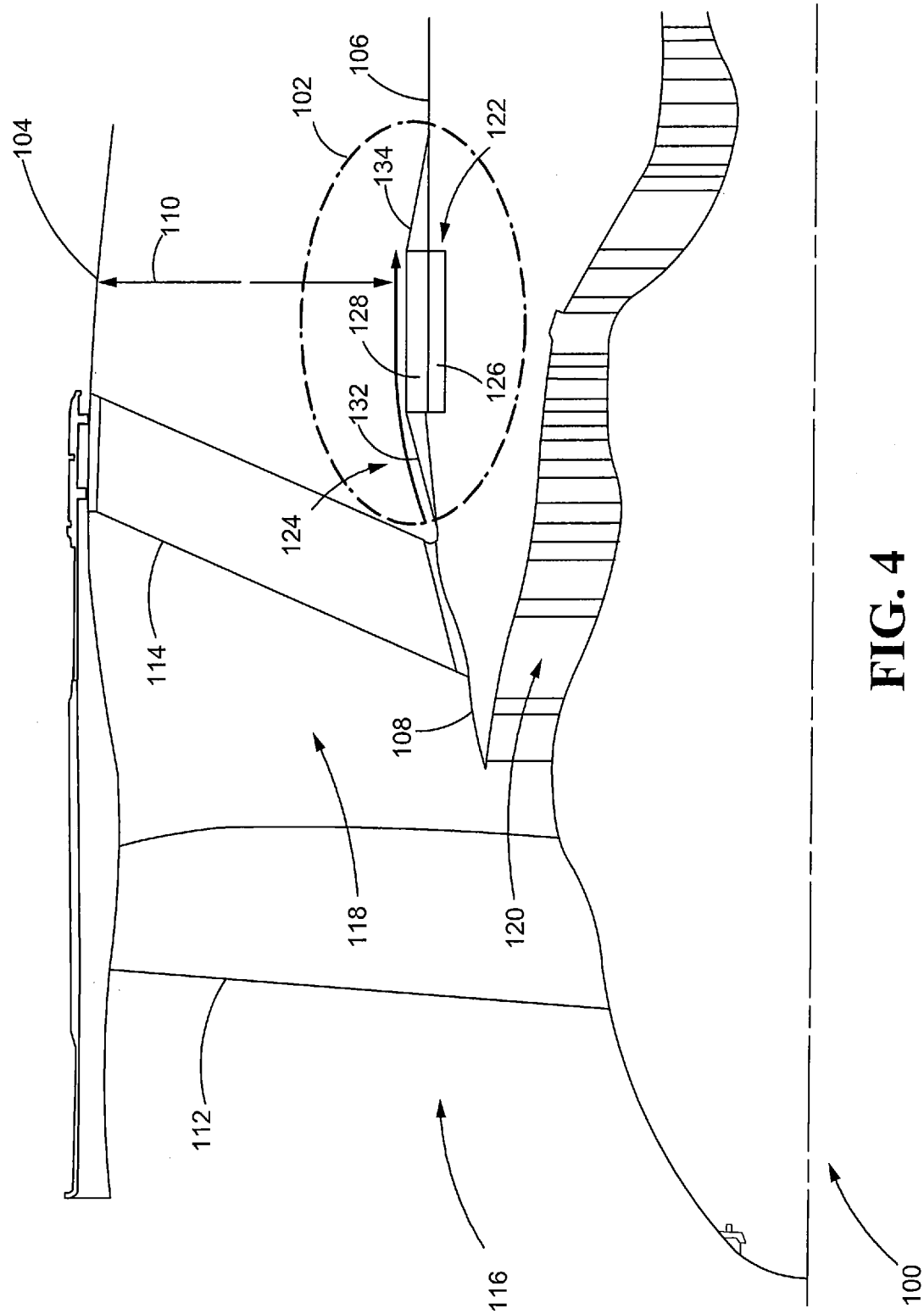
FIG. 4 is a partial, cross-sectional view of a low pressure compressor section of a gas turbine engine having a fan air diverter with fore and aft nozzle flaps.

In other embodiments, the fan air diverter 124 may optionally provide a nozzle flap 134 at the aft or outlet-side of the annular air-oil cooler 122 in addition to the nozzle flap 132 at the fore or inlet-side of the annular air-oil cooler 122 to provide further variability of the fan nozzle area, as shown for example in FIG. 4. In still further embodiments, the configuration of the fan air diverter 124 and each nozzle flap 132, 134 thereof may be varied as illustrated in FIGS. 5-7. In particular, each nozzle flap 132, 134 may be configured such that either the leading edge or trailing edge thereof is hinged relative to the inner cowl 106 or the cooling fins 128.

Figure 5A:
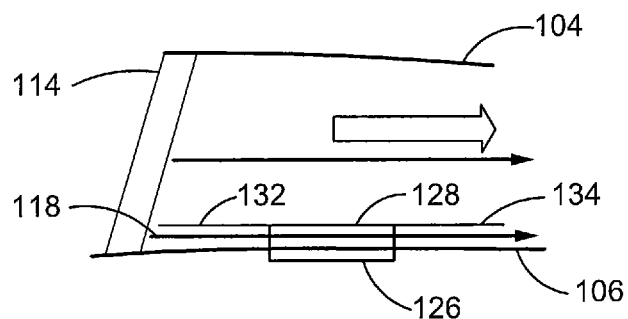
FIGS. 5A-5C are cross-sectional views of a fan air diverter with fore and aft nozzle flaps in fully open, intermediate and fully closed positions.
Figure 5B:
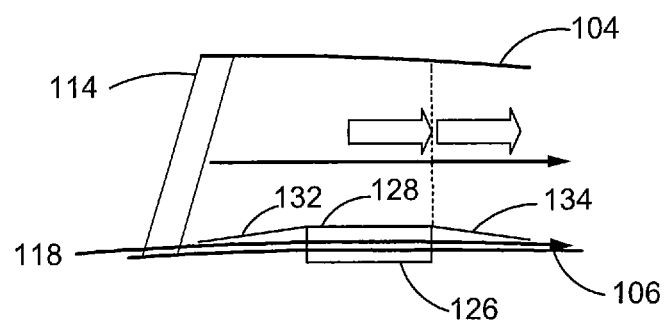
Figure 5C:
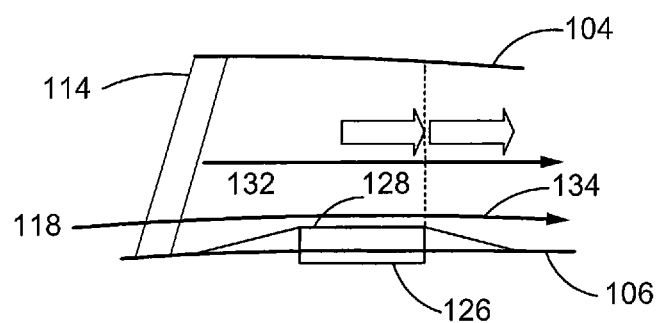

As shown in FIGS. 5A-5C for example, the trailing edge of the fore nozzle flap 132 is hinged or otherwise coupled to the inlet-side of the cooling fins 128 so as to open or close relative to the outer surface of the inner cowl 106, while the leading edge of the aft nozzle flap 134 is hinged to the outlet-side of the cooling fins 128. In the fully open positions of FIG. 5A, the fan air diverter 124 may provide a generally converging fan airflow 118 through the fan nozzle 110 and the cooling fins 128. In the intermediate positions of FIG. 5B, the fan air diverter 124 may provide a moderately converging-diverging fan airflow 118, or a fan airflow 118 which converges toward the outlet-side of the cooling fins 128, and then diverges at least temporarily thereafter. The fully closed positions of FIG. 5C provide similar effects to the positions of FIG. 5B but to a greater degree, and thereby provides an increased converging-diverging fan airflow 118.

In FIGS. 6A-6C, the leading edge of the fore nozzle flap 132 is hinged to the inner cowl 106, while the leading edge of the aft nozzle flap 134 is hinged to the outlet-side of the cooling fins 128. As in FIGS. 5A-5C, the fully open, intermediate and fully closed positions of FIGS. 6A-6C may similarly provide generally converging, moderately converging-diverging and increased converging-diverging fan airflows 118, respectively. Furthermore, in FIGS. 7A-7C, the leading edge of the fore nozzle flap 132 is hinged to the inner cowl 106 as in FIGS. 6A-6C, while the trailing edge of the aft nozzle flap 134 is hinged to the inner cowl 106. Similar to previous embodiments, the fully open, intermediate and fully closed positions of FIGS. 7A-7C may provide generally converging, moderately converging-diverging and increased converging-diverging fan airflows 118, respectively. By adjusting the contour of the inner cowl 106 and/or outer nacelle 104 in the vicinity of the annular air-oil cooler 122 and fan air diverter 124, other nozzle configurations can also be realized. Other alternate combinations of positions or other intermediate positions not shown will be apparent to those of skill in the art.

Figure 8:
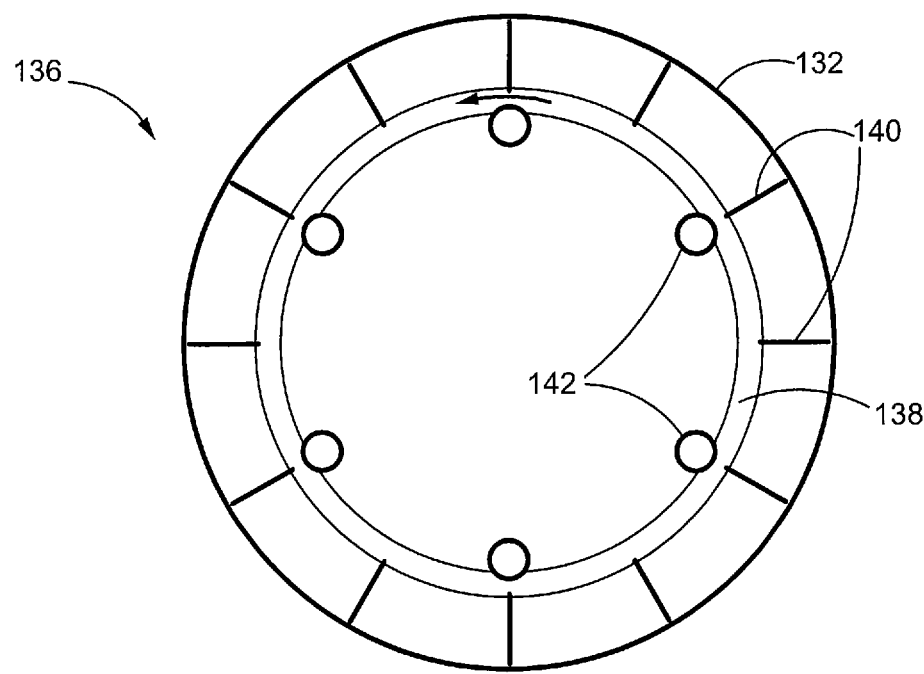
FIG. 8 is an axial, cross-sectional view of one actuator assembly of a fan air diverter.
Figure 9:
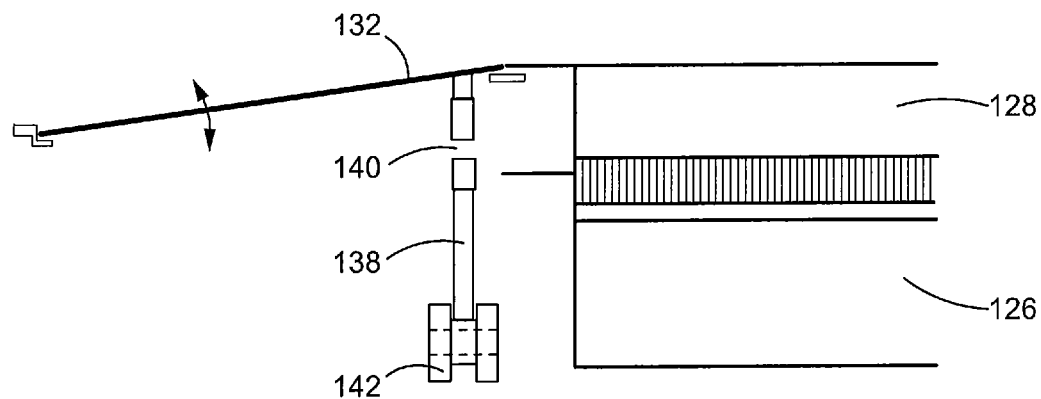
FIG. 9 is a partial, cross-sectional view of the actuator assembly of FIG. 8.

Turning now to FIGS. 8 and 9, cross-sectional views of one exemplary embodiment of an actuation system assembly 136 for the fan air diverter 124 are provided. As shown, the actuation system assembly 136 may include a sync ring 138 that is circumferentially and coaxially disposed between the low pressure compressor and the nozzle flap 132, and configured to be rotatable between a first angular position and a second angular position about the engine axis. The actuation system assembly 136 may further include a plurality of idler links 140 radially coupling the sync ring 138 to the nozzle flaps 132 as shown. Moreover, each idler link 140 may be pivotally configured such that rotating the sync ring 138 in the first direction or toward the first angular position moves the nozzle flap 132 into the open position, and rotating the sync ring 138 in the opposing, second direction or toward the second angular position moves the nozzle flap 132 into the closed position. The actuation system assembly 136 may further include a plurality of roller guides 142 rotatably disposed relative to the sync ring 138 to enable rotation of the sync ring 138 with reduced friction. The roller guides 142 may be radially provided along the inner edge of the sync ring 138 as shown and/or along the outer edge thereof.

Figure 10:
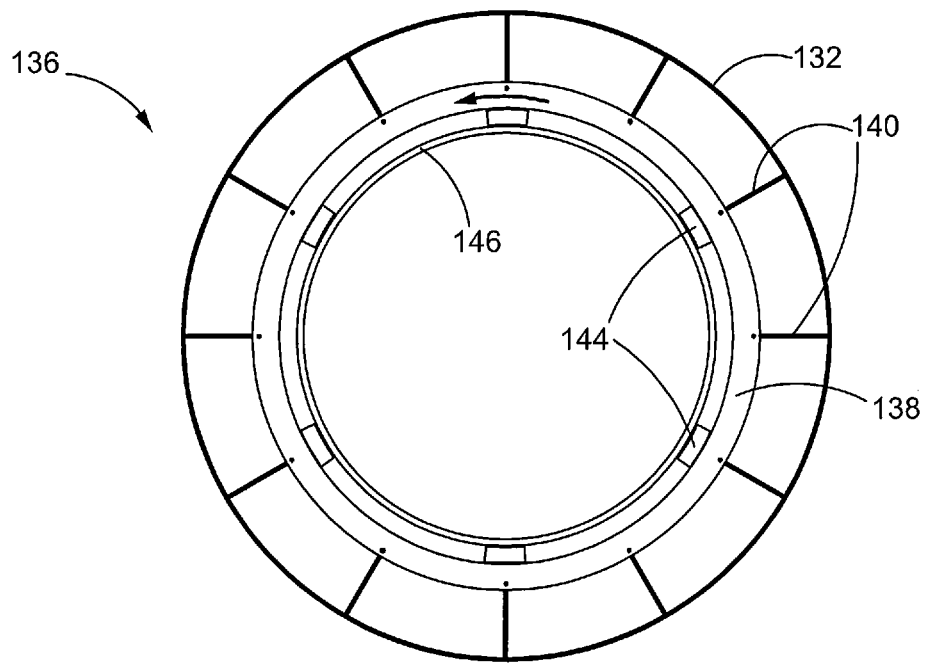
FIG. 10 is an axial, cross-sectional view of another actuator assembly of a fan air diverter.
Figure 11:
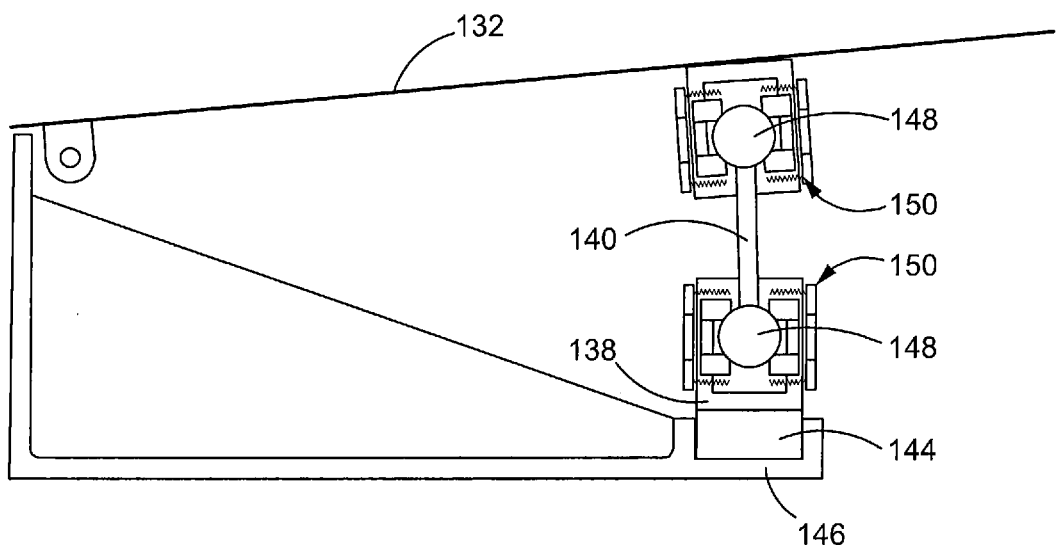
FIG. 11 is a partial, cross-sectional view of the actuator assembly of FIG. 10.

Referring to FIGS. 10 and 11, axial and side cross-sections of another exemplary embodiment of an actuation system assembly 136 are provided. As in the embodiment of FIGS. 8 and 9, the actuation system assembly 136 of FIGS. 10 and 11 may employ a sync ring 138 and a plurality of idler links 140 radially disposed between the sync ring 138 and the nozzle flaps 132. Rather than roller guides 142, however, the actuation system assembly 136 may employ a plurality of bumpers 144 radially distributed between the sync ring 138 and a guide ring 146. In one possible implementation, each idler link 140 may include ball ends 148 which pivotally couple to each of the nozzle flap 132 and the sync ring 138 as shown in FIG. 11 to form ball joints 150. Furthermore, the bumpers 144 may be formed of a low-friction material with shock absorbent properties. The bumpers 144 may also be shimmed to allow clearance adjustments between the sync ring 138 and the guide ring 146.

As in previous embodiments, the actuation system assembly 136 of FIGS. 10 and 11 may be similarly configured such that rotating the sync ring 138 in the first direction or toward the first angular position pivots the idler links 140 in a manner which moves the nozzle flap 132 into the open position, and rotating the sync ring 138 in the opposing, second direction or toward the second angular position pivots the idler links 140 in a manner which moves the nozzle flap 132 into the closed position. The actuation system assemblies 136 of FIGS. 8-11 may also be implemented using any other kinematic mechanism for converting linear or rotary motion of an actuator into a rotation of the sync ring 138, or any other suitable means for modulating the nozzle flaps 132, 134 on demand. Furthermore, the modulating fan air diverter 124 and the associated actuation system assembly 136 may be installed in the stationary portion of the inner cowl 106, or the inner fixed structure, so as not to be impacted by or in otherwise interference with the opening of associated engine core cowl doors. Still further, while the foregoing actuation system assemblies 136 were disclosed in relation to fore or inlet-side nozzle flaps 132, similar actuator assemblies may be separately provided and appropriately configured for any aft or outlet-side nozzle flaps 134.

The foregoing disclosure is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the present disclosure may be practiced other than as specifically described. For that reason, the appended claims should be studied to determine true scope and content.

What is claimed is:

1. A fan air diverter for a gas turbine engine having at least an inner cowl radially inward from an outer nacelle and an annular air-oil cooler, the fan air diverter comprising:
a nozzle flap disposed about the inner cowl and coaxially adjacent to the annular air-oil cooler, the nozzle flap being pivotally coupled to the inner cowl at a point of securement that is axially spaced from the annular air-oil cooler, the nozzle flap being selectively movable relative to the annular air-oil cooler between an open position and a closed position, wherein the annular air-oil cooler includes a plurality of cooling fins that extend radially outward past the point of securement; and
an actuation system assembly operatively coupled to the nozzle flap, the actuation system assembly being configured to actuate the nozzle flap between the open position and the closed position, wherein the actuation system assembly comprises: at least one sync ring operatively coupled to the nozzle flap, the at least one sync ring being rotatable between a first angular position and a second angular position about an axis of the gas turbine engine, wherein rotation of the at least one sync ring to the first angular position moves the nozzle flap to the open position, and rotation of the at least one sync ring to the second angular position moves the nozzle flap to the closed position, wherein the nozzle flap provides at least one of a converging fan airflow through a fan nozzle and the cooling fins, a converging-diverging fan airflow through the fan nozzle and the cooling fins, and a fan airflow that converges toward an outlet-side of the cooling fins.

2. The fan air diverter of claim 1, wherein the nozzle flap includes two or more arcuate segments circumferentially disposed about a surface of the inner cowl, and about an inner fixed structure at a fore of a core cowl.

3. The fan air diverter of claim 1, wherein the nozzle flap is axially positioned forward of the annular air-oil cooler, the nozzle flap having a leading edge that is pivotally hinged to a surface of the inner cowl and a trailing edge that is movable between the open position and the closed position relative to an inlet of the annular air-oil cooler.

4. The fan air diverter of claim 1, wherein the nozzle flap, in the open position, enables fan airflow toward a corresponding portion of the annular air-oil cooler and provides an increased fan nozzle area, and in the closed position, diverts fan airflow away from a corresponding portion of the annular air-oil cooler and provides a decreased fan nozzle area.

5. The fan air diverter of claim 1, wherein the nozzle flap is axially positioned aft of the annular air-oil cooler, the nozzle flap having a leading edge that is movable between the open position and the closed position relative to an outlet of the annular air-oil cooler and a trailing edge that is pivotally hinged to a surface of the inner cowl.

6. The fan air diverter of claim 1, wherein the actuation system assembly further comprises: a plurality of idler links radially coupling the at least one sync ring to the nozzle flap, and wherein the at least one sync ring is circumferentially disposed between a low pressure compressor case and the nozzle flap.

7. The fan air diverter of claim 6, wherein the actuation system assembly further comprises a plurality of roller guides disposed between the at least one sync ring and an outer surface of the low pressure compressor case so as to enable rotation of the at least one sync ring about a central axis of the gas turbine engine.

8. The fan air diverter of claim 6, wherein the actuation system assembly further comprises a guide ring circumferentially disposed between the at least one sync ring and an outer surface of the low pressure compressor case, the guide ring being rigidly coupled to an assembly mounted to the gas turbine engine, the at least one sync ring being slidably rotatable about the guide ring via a plurality of bumpers disposed therebetween.

9. An oil cooling assembly for a gas turbine engine having at least an inner cowl, comprising:
an annular air-oil cooler disposed about the inner cowl, the annular air-oil cooler including an integral annular oil tank and a plurality of cooling fins radially extending therefrom, the cooling fins being disposed in at least partial communication with a fan duct and a fan nozzle; and a fan air diverter disposed about the inner cowl and coaxially adjacent to the cooling fins, the fan air diverter being selectively movable relative to the cooling fins to provide at least one of a converging fan airflow through the fan nozzle and the cooling fins, a converging-diverging fan airflow through the fan nozzle and the cooling fins, and a fan airflow that converges toward an outlet-side of the cooling fins, wherein the plurality of cooling fins extend radially outward past a point of pivotal securement of the fan air diverter to the inner cowl, wherein the point of pivotal securement of the fan air diverter to the inner cowl is axially spaced from the annular air-oil cooler.

10. The oil cooling assembly of claim 9, wherein the fan air diverter is selectively movable between an open position and a closed position, the fan air diverter in the open position enabling fan airflow toward a corresponding portion of the annular air-oil cooler and providing an increased fan nozzle area, the fan air diverter in the closed position diverting fan airflow away from a corresponding portion of the annular air-oil cooler and providing a decreased fan nozzle area.

11. The oil cooling assembly of claim 9, wherein the fan air diverter comprises a nozzle flap pivotally coupled to the inner cowl at the point of pivotal securement, the nozzle flap being selectively movable relative to the cooling fins between an open position and a closed position.

12. The oil cooling assembly of claim 11, wherein the nozzle flap is axially positioned forward of the cooling fins, the nozzle flap having a leading edge that is pivotally hinged to a surface the inner cowl at the point of pivotal securement and a trailing edge that is movable between the open position and the closed position relative to an inlet of the annular air-oil cooler.

13. The oil cooling assembly of claim 11, wherein the nozzle flap is axially positioned aft of the cooling fins, the nozzle flap having a leading edge that is movable between the open position and the closed position relative to an outlet of the annular air-oil cooler and a trailing edge that is pivotally hinged to a stationary surface of the inner cowl at the point of pivotal securement.

14. The oil cooling assembly of claim 9, wherein the fan air diverter comprises a fore nozzle flap pivotally disposed adjacent to the plurality of cooling fins at an inlet of the annular air-oil cooler and an aft nozzle flap pivotally disposed adjacent to the plurality of cooling fins at an outlet of the annular oil cooler, each of the fore nozzle flap and the aft nozzle flap being independently actuatable so as to modulate fan airflow and fan nozzle area.

15. The oil cooling assembly of claim 9, wherein the fan air diverter comprises a nozzle flap and an actuation system assembly operatively coupled to the nozzle flap, the actuation system assembly being configured to selectively move the nozzle flap between an open position and a closed position relative to the plurality of cooling fins.

16. The oil cooling assembly of claim 15, wherein the actuation system assembly comprises: at least one sync ring circumferentially disposed between an outer surface of an associated low pressure compressor case and the nozzle flap, the at least one sync ring being rotatable between a first angular position and a second angular position about a central axis of the gas turbine engine; and a plurality of idler links radially coupling the at least one sync ring to the nozzle flap, the idler links being pivotally configured such that rotation of the at least one sync ring to the first angular position moves the nozzle flap to the open position, and rotation of the at least one sync ring to the second angular position moves the nozzle flap to the closed position.

17. A gas turbine engine, comprising:
an outer nacelle;
an inner cowl defining a fan duct and nozzle along with the outer nacelle for receiving fan airflow;
an annular air-oil cooler disposed circumferentially about the inner cowl and in communication with a fan nozzle;
at least one nozzle flap disposed about the inner cowl and coaxially adjacent to the annular air-oil cooler, the at least one nozzle flap being pivotally coupled to the inner cowl at a point of securement that is axially spaced from the annular air-oil cooler and selectively movable relative to the annular air-oil cooler between an open position and a closed position, wherein the annular air-oil cooler includes a plurality of cooling fins that extend radially outward past the point of securement; and
an actuation system assembly operatively coupled to the at least one nozzle flap, the actuation system assembly being configured to actuate the at least one nozzle flap between the open position and the closed position so as to modulate fan airflow and to provide at least one of a converging fan airflow through the fan nozzle and the plurality of cooling fins, a converging-diverging fan airflow through the fan nozzle and the plurality of cooling fins, and a fan airflow that converges toward an outlet-side of the plurality of cooling fins.

18. The gas turbine engine of claim 17, wherein the at least one nozzle flap includes a fore nozzle flap pivotally disposed adjacent to an inlet of the annular air-oil cooler and an aft nozzle flap pivotally disposed adjacent to an outlet of the annular air-oil cooler, the fore nozzle flap having a leading edge that is pivotally hinged to a surface of the inner cowl and a trailing edge that is movable between the open position and the closed position relative to the inlet of the annular air-oil cooler, the aft nozzle flap having a leading edge that is movable between the open position and the closed position relative to the outlet of the annular air-oil cooler and a trailing edge that is pivotally hinged to a stationary surface of the inner cowl.

19. The gas turbine engine of claim 17, wherein the actuation system assembly comprises: at least one sync ring circumferentially disposed between an outer surface of a low pressure compressor case and the at least one nozzle flap, the at least one sync ring being rotatable between a first angular position and a second angular position about a central axis of the gas turbine engine; and a plurality of idler links radially coupling the at least one sync ring to the at least one nozzle flap, the idler links being pivotally configured such that rotation of the at least one sync ring to the first angular position moves the at least one nozzle flap to the open position, and rotation of the at least one sync ring to the second angular position moves the at least one nozzle flap to the closed position and wherein the actuation system assembly is installed in an inner fixed structure of the inner cowl in a manner configured to minimize any interference with one or more core cowl doors of the gas turbine engine.

20. The gas turbine engine of claim 19, wherein the actuation system assembly comprises a guide ring circumferentially disposed between the at least one sync ring and the outer surface of the low pressure compressor case, the guide ring being rigidly coupled to an assembly mounted to the gas turbine engine, the at least one sync ring being rotatable about the guide ring sliding on one or more bumpers.

* * * * *